(12) United States Patent
Adcock, Jr.

(10) Patent No.: US 8,984,789 B2
(45) Date of Patent: Mar. 24, 2015

(54) VERTICAL FOREGRIP

(71) Applicant: Switch Grip LLC, Massillon, OH (US)

(72) Inventor: Torrance L. Adcock, Jr., Bethesda, MD (US)

(73) Assignee: Switch Grip LLC, Massillon, OH (US)

( * ) Notice: Subject to any disclaimer, the term of this patent is extended or adjusted under 35 U.S.C. 154(b) by 0 days.

(21) Appl. No.: 14/145,509

(22) Filed: Dec. 31, 2013

(65) Prior Publication Data

US 2014/0182182 A1 Jul. 3, 2014

Related U.S. Application Data

(60) Provisional application No. 61/747,705, filed on Dec. 31, 2012.

(51) Int. Cl.
*F41C 23/00* (2006.01)
*F41C 27/16* (2006.01)
*F41C 23/16* (2006.01)

(52) U.S. Cl.
CPC ............. *F41C 27/16* (2013.01); *F41C 23/16* (2013.01)
USPC ................... 42/72; 42/71.01; 42/106

(58) Field of Classification Search
CPC ........... F41C 23/16; F41C 23/22; F41C 27/16
USPC ............................... 42/72, 71.01, 106
See application file for complete search history.

(56) References Cited

U.S. PATENT DOCUMENTS

| 545,528 | A | 9/1895 | Paul |
| 1,023,741 | A | 4/1912 | Kreith |
| 1,231,058 | A | 6/1917 | Pansa |
| 2,805,507 | A | 9/1957 | Buquor |
| 5,594,967 | A | 1/1997 | Morton et al. |
| 8,650,791 | B2 * | 2/2014 | Williams ............. 42/72 |
| 2006/0162224 | A1 | 7/2006 | Connal |
| 2007/0271832 | A1 | 11/2007 | Griffin |
| 2009/0133309 | A1 | 5/2009 | Cahill |
| 2010/0132239 | A1 | 6/2010 | Moody et al. |

FOREIGN PATENT DOCUMENTS

CN 1195105 A 10/1998

OTHER PUBLICATIONS

Http://www.m34tactical.com/raptor.html, "Raptor Dagger", printed Jun. 12, 2013, website is undated but inventor believes the website is older than May 14, 2013.

(Continued)

*Primary Examiner* — J. Woodrow Eldred
(74) *Attorney, Agent, or Firm* — Sand & Sebolt; Howard L. Wernow

(57) ABSTRACT

A foregrip for a firearm may comprise a mounting device configured to attach to a mounting rail of a firearm and a grip body. The grip body may include a top portion configured to be removably attached to the mounting device and a lateral side portion configured to be gripped by the hand of a person using a firearm. A cavity may be disposed within the grip body, and a blade may be disposed at least partially within the cavity, wherein the blade is movable between a retracted position and a deployed position relative to the grip body.

1 Claim, 5 Drawing Sheets

(56) References Cited

OTHER PUBLICATIONS

Http://www.flickr.com/photos/48470964@N002/4442555408, pimpmygun.doctornoob.com, printed Jun. 12, 2013, website is undated but inventor believes the website is older than May 14, 2013 (unable to print original website as site no longer exists).
http://flickr.com/photos/48470964@n02/4444306510/in/photostream, pimpmygun.doctornoob.com, printed Jun. 12, 2013, website is undated but inventor believes the website is older than May 14, 2013 (unable to print original website as site no longer exists).
www.everydaynodaysoff.com/2012/07/05/bringing-a-knight-to-a-gunfight/, "Bringing a Knight to a Gunfight", author unknown, printed Jun. 12, 2013, website is undated but inventor believes the website is older than May 14, 2013.
www.amazon.com, "Kubaton 4 In. Black Keychain with Concealed Knife", printed Jun. 12, 2013, website is undated but inventor believes the website is older than May 14, 2013.
www.ar15.com, "Samson Knives for The AR15 Grip with Pics", Printed Jun. 12, 2013, website is undated but inventor believes the website is older than May 14, 2013.
International Search Report and Written Opinion for PCT Application No. PCT/US2013/078504, mailed May 1, 2014.

* cited by examiner

US 8,984,789 B2

VERTICAL FOREGRIP

BACKGROUND OF THE INVENTION

This invention relates to firearms, and in particular, to a foregrip removably attached to the forward part of a rifle.

The AR (Armalite Rifle) platform has been the United States standard battle rifle platform for the past fifty years. Introduced in the 1960's as a replacement for the M-14 rifle, M-16's were deployed in Vietnam as the military's new standard battle rifle. The M-16 was originally known as the AR-15, the designation originating from the Armalite company that produces the first M-16's.

In the intervening years, the AR platform evolved to more sophisticated configurations and capabilities. One major innovation was the introduction of the Picatinny rail system adopted Feb. 3, 1995 as a standardized mounting system that allows accessories from multiple vendors to be mounted on the battle rifle and interchangeable from one weapon to another.

The Picatinny rail, alternatively known as the U.S. MIL-STD-1913 rail, NATO Stanag 2324 rail, or simply "Tactical Rail," is a bracket used on firearms in order to provide a standardized mounting platform. The Picatinny rail is a dovetail or T-shaped mount with diagonal grooves that prevent the mounting accessory from moving back and farther due to recoil. The rail comprises a series of ridges with a T-shaped cross-section interspersed with flat "spacing slots." Accessories are mounted either by sliding them on from one end to the other, by means of a mount which is clamped to the rail with bolts, thumbscrews or levers, or onto the slots between raised sections.

With the advent of the Picatinny rail system, manufacturers began producing various accessories to aid soldiers in the field with a wide array of products ranging from multiple telescopic sights, range-finding devices, red-dot aiming devices, laser aiming devices, rail-mounted flashlights, alternate sights, and bi-pods, all of which represents the majority of catagories of accessories available for mounting on the Picatinny rails. Vertical foregrips and other accessories mounted at the 6 o'clock position on shoulder fired weapons have become known in military, law enforcement and civilian arenas.

A vertical foregrip is designed to attach to a firearm for the forward hand (or "offhand"). These aid in the maneuverability of the firearm, since the natural angle of a person's outstretched hand is more oriented to grasping objects at a vertical angle, rather than a horizontal one perpendicular to the body. Prior art foregrips attachable to rifles provide some levels of utilization but are less functional in design. Most foregrips of this type are constructed whereby the interior of the foregrip is a hollow cavity for storing "small parts." Other uses comprise installing batteries inside the foregrip cavity to power Picatinny rail-mounted flashlights, or where the foregrip and flashlight are an integral unit and the batteries again are contained within the foregrip cavity. Some prior art grips provide the option of allowing the foregrip to be positioned at various angles.

SUMMARY OF THE INVENTION

Applicant has devised several accessories configured for the Picatinny rail system that are not only unique in design, but are highly functional as well. The functionality is in keeping with the demands of soldiers, police and civilian shooters who require ease of use, practicality, and ruggedness from the equipment they must rely on when in the field and under harsh conditions. Additional variations on the present invention incorporate multi-functionality within these devices. The differences lie in the use of the functional devices incorporated into vertical foregrips making them not only unique but practical as well, all of which feature requested "one-handed" operation.

To accomplish this, the present invention provides a vertical foregrip (VFG) in several configurations. Each configuration provides end-users with a secure grip for holding the weapon in a firing position while also providing additional functionality in the form of tools and other functional devices that are incorporated into the grip itself for use while in the field. The invention grip is not merely used to store articles, but is an integral part of the tool itself.

For purposes of this application Applicant provides five configurations as follows. Version #1 (VFG-1) provides a vertical foregrip with an integral sliding blade. Version #2 (VFG-2) provides a vertical foregrip with an integral razor (or box-cutter). Version #3 (VFG-3) provides a vertical foregrip with an integral multi-tool configuration (similar to a Swiss army knife). Version #4 (VFG-4) provides a vertical foregrip with an integral flashlight). Version #5 (VFG-5) provides a vertical foregrip which may be rotated to a horizontal position.

These together with other objects of the invention, along with various features of novelty, which characterize the invention, are pointed out with particularity in the drawings and specification annexed hereto and forming a part of this disclosure. For a better understanding of the invention, its operating advantages and the specific objects attained by that engage the flangesits uses, reference should be had to the accompanying drawings and descriptive matter in which there is illustrated a preferred embodiment of the invention.

DETAILED DESCRIPTION OF INVENTION

Figure 1:
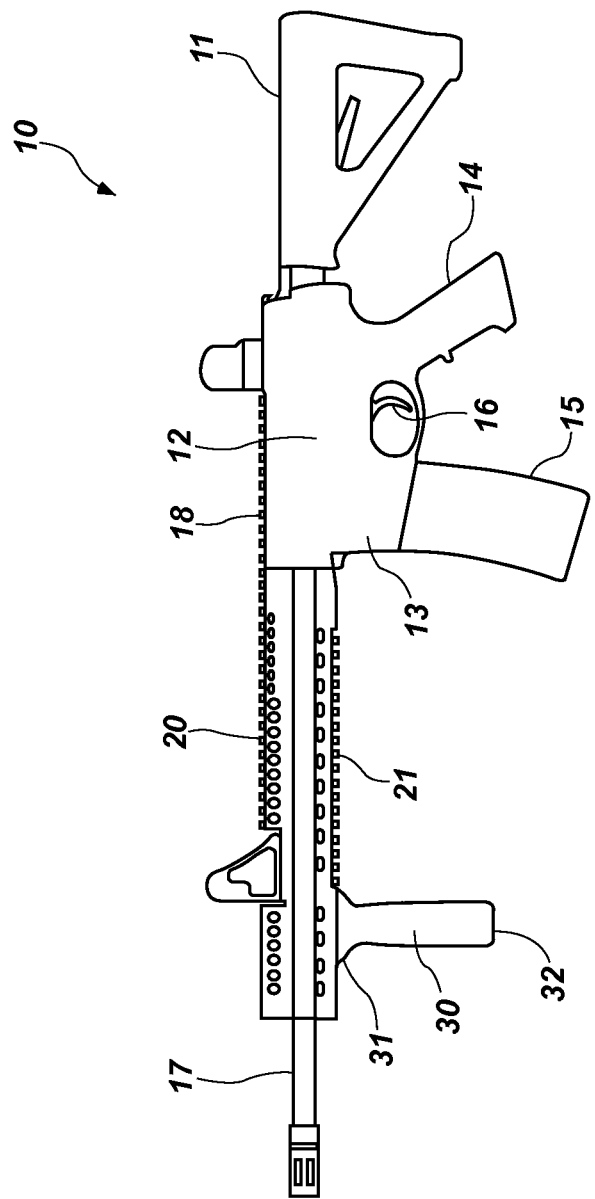
FIG. 1 is side view of a M-16 battle rifle with vertical foregrip.

Referring to the drawings in detail wherein like elements are indicated by like numerals, there are the five versions of the VFG as briefly described above. VFG-1 provides a vertical foregrip with an integral sliding blade. VFG-2 provides a vertical foregrip with an integral razor. VFG-3 provides a vertical foregrip with an integral multi-tool configuration. VFG-4 provides a vertical foregrip with an integral flashlight) . VFG-5 provides a vertical foregrip which may be rotated to a horizontal position.

FIG. 1 illustrates a conventional combat firearm, i.e., a U.S. M-16. The firearm 10 has a stock 11 forming the firearm rearward portion. The stock 11 terminates forwardly in an upper receiver 12 attached to a lower receiver 13 from which a pistol grip 14 downwardly and rearwardly protrudes. A magazine 15 protrudes downwardly and forwardly from the lower receiver 13. A trigger 16 protrudes downwardly from the lower receiver 13 between the pistol grip 14 and magazine 15. A rifle barrel 17 extends forwardly from the upper receiver 12 and defines the forward portion of the firearm. The longitudinal axis of the firearm 10 is defined by the stock 11, upper receiver 12 and barrel 17. A Picatinny rail assembly 20 extends from the upper receiver top 18 forward about a portion of the barrel 17, including rails 21 along the barrel's twelve, three, six and nine o'clock positions.

Figure 2:
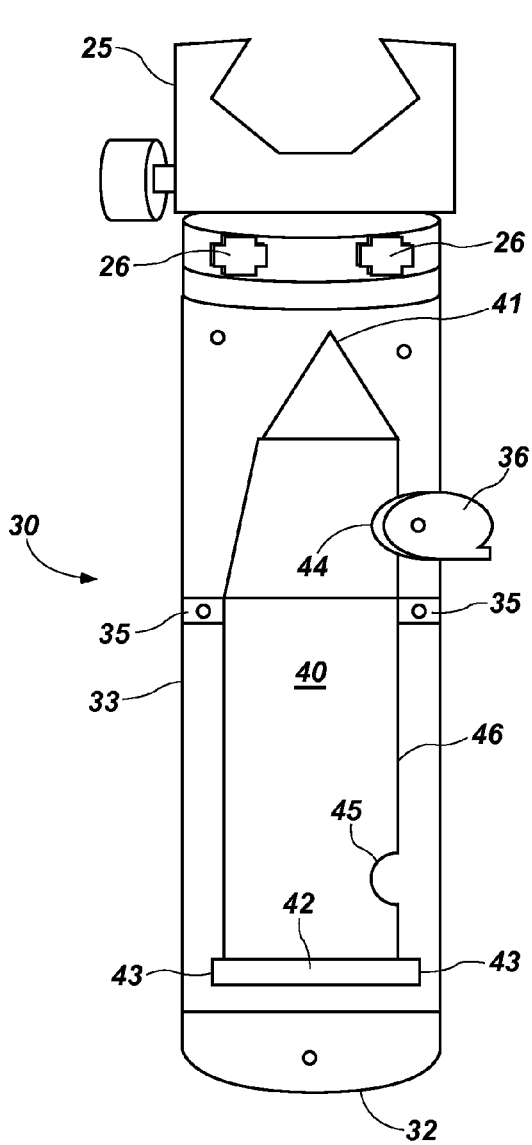
FIG. 2 is a diagrammed view of a vertical foregrip with integral sliding blade attached to a rail mounting device.
Figure 3:
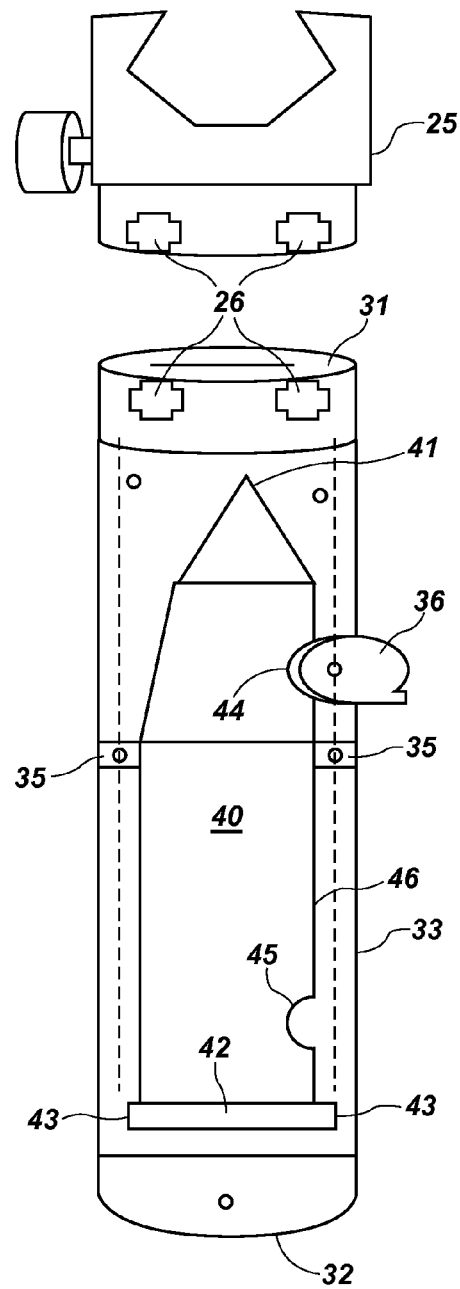
FIG. 3 is a diagrammed view of the vertical foregrip with blade fully inserted and separated from the mounting device.
Figure 4:
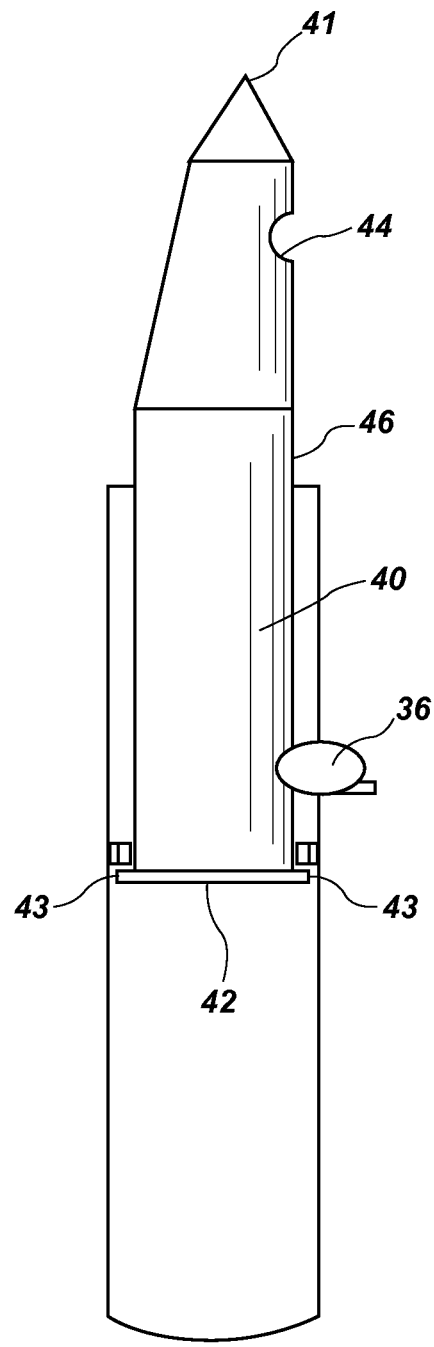
FIG. 4 is a diagrammed view of the vertical foregrip with blade deployed.
Figure 7:
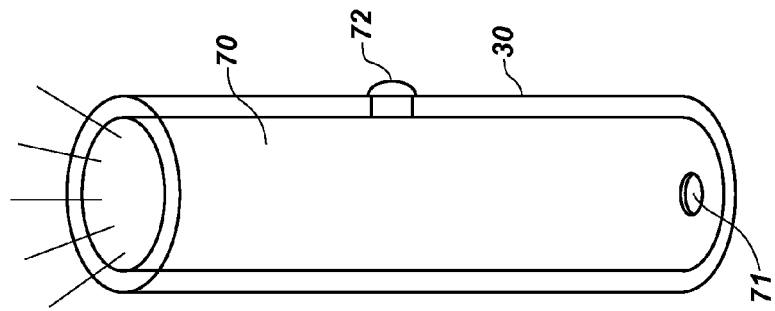
FIG. 7 is a diagrammed view of the vertical foregrip with spare flashlight.
Figure 6:
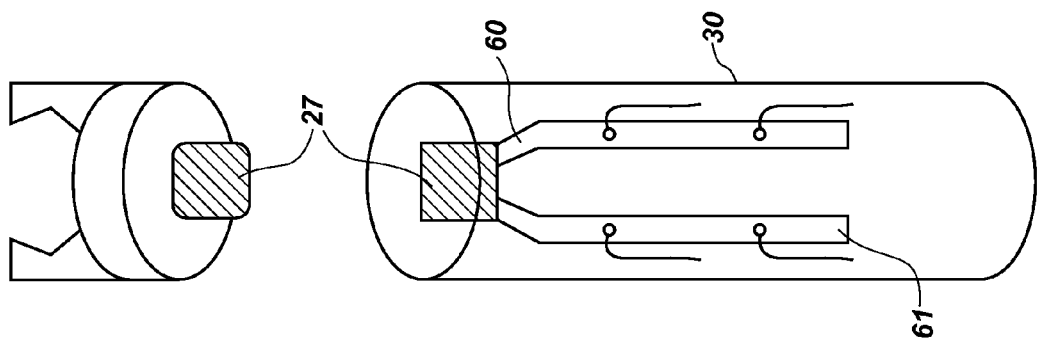
FIG. 6 is a diagrammed view of the vertical foregrip with multi-tool enclosed.
Figure 5:
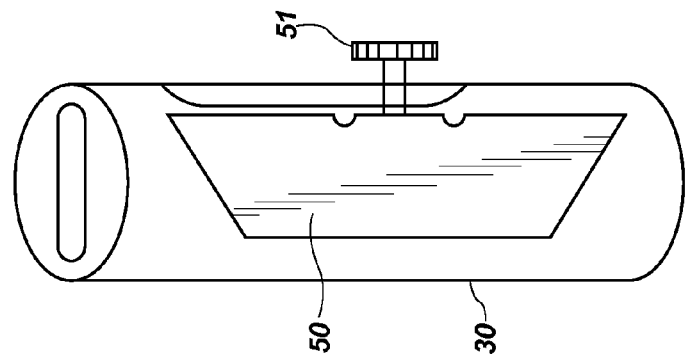
FIG. 5 is a diagrammed view of the vertical foregrip with box-cutter enclosed.
Figure 8:
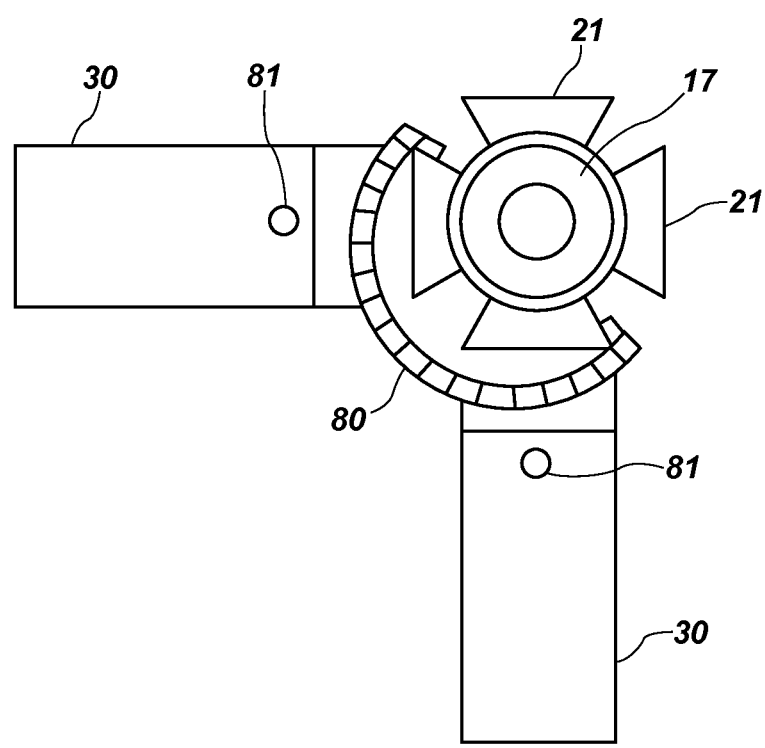
FIG. 8 is a diagrammed view of the vertical foregrip with trunnion.

Referring to FIGS. 2-4, the VFG-1 (vertical foregrip with an integral sliding blade) attaches to the Picatinny rail system rail 21 at the six o'clock position to provide shooters with a firm grip of the weapon to help position the rifle securely in the "pocket" of the shoulder as a solid platform from which to shoot the weapon and engage threats. The forward grip 30 is hollow and has a top 31, bottom 32, and sides 33 extending from bottom to top, said top, bottom and sides defining a grip interior 34. The grip top 31 removably connects to a rail mounting device 25 by means of locking lugs, threads or similar removably attachment means 26. The rail mounting device 25 is adapted to connect to a Picatinny rail 21. The grip interior 34 contains an elongated knife blade 40 having a distal end 41 and a proximal end 42. The knife blade distal end 41 typically will terminate in a point.

The integral knife blade 40 and grip 30 mounting device 25 attaches to the Picatinny rail 21 via the mounting device 25 which is a circular, threaded component to which the top 31 of the foregrip itself is attached. Attachment is achieved by inserting the top 31 of the foregrip into the mounting device, pressing upward to engage special threads or lugs, and turning the foregrip to lock the lugs into place to the mounting device. This action is similar to how the cap for some popular water bottles is attached to the bottle. As the cap is twisted it unlocks from the special internal threads, then the cap is separated from the bottle. To reattach the cap, the cap is pressed down onto the bottle to engage the special threads and twisted to lock the cap to the bottle. In similar fashion, the VFG threads require that the foregrip be inserted in a vertical manner then twisted to engage the locking threads/lugs, thus securing the foregrip to the weapon.

Additionally, the foregrip 30 is constructed in two halves and secured by threaded screws or pins. The two halves are machined or milled on the interior face to form a cavity 34 to accept the sliding knife blade 40 that resides on the interior of the foregrip. The channel for the knife blade has two "stops" or blocks 35 machined into the surface just below the locking mechanism that engage lateral flanges 43 on the knife blade proximal end 42 to prevent the blade from sliding completely out of the foregrip interior 34.

The grip 30 has a locking mechanism 36 comprised of a thumb-activated toggle-switch type component that performs several functions. (1) Starting with the blade retracted within the foregrip the toggle switch 36 is pressed or rolled forward (or backward) to disengage from a top notch 44 machined into the blade itself thus freeing the blade to slide out of the foregrip. Owing to different construction approaches, the toggle switch can be made alternately to release the blade upon pressing forward on the toggle switch or pulling back on the toggle switch, and also can use springs to re-set the position of the toggle switch with each action. (2) After activating the toggle switch, releasing or deploying the blade requires that the foregrip be given a quick flick of the wrist (or pointed downward to allow gravity to deploy the blade) so the blade slides out the top of the foregrip. The toggle switch 36 is activated to engage a second lower notch 45 on the blade thus locking the blade in a deployed position. (3) To retract the blade, the toggle switch 36 is again activated to release from the lower blade notch 45, and the blade/foregrip is held in an upright position permitting gravity to return the blade 40 to a retracted position and the toggle switch 36 is again re-set into the top notch 44 to retain the blade 40 within the foregrip interior 34.

The sliding knife blade has several features to make it functional with the foregrip. The spine or back edge (non-cutting surface) 46 has two half-moon indentations 44,45 milled into the blade at a specified distance apart to properly engage the toggle switch 36 and position the knife blade 40 in the correct positions whether deployed or retracted. The proximal end 42 of the blade has two slightly protruding flanges 43 that engage the "stops" 35 within the foregrip interior 34 to prevent the blade from sliding completely out of the foregrip.

The body of the foregrip that holds the knife blade is manufactured in such a manner that the toggle switch falls naturally under the thumb as the hand grasps the foregrip and activates the release mechanism. Also, the body of the foregrip is manufactured in two halves and joined by removable screws or pins so the blade can be serviced for cleaning, re-sharpening, or replacement. Lastly, the top 31 of the foregrip is manufactured in such a manner as to engage with the Picatinny rail mounting device 25 such that when the foregrip is rotated the special threads or lugs on the interior of the grip disengage and the foregrip is pulled free of the Picatinny mounting device.

In use, the end-user (soldier, police officer, or civilian shooters) grasps the grip 14 of the rifle with the firing hand and the vertical foregrip 30 with the free hand. Using the vertical foregrip, shooters pull the rifle tight against their shoulder to provide a stable platform for aiming and shooting the weapon.

When shooters need to deploy the knife 40, as they already are grasping the body of the foregrip, they push the grip tighter into the mounting device 25 and twist the foregrip 30 to release the locking threads/lugs from the mounting device then pull down on the foregrip to free it from the mounting device. With the thumb of the hand grasping the foregrip, shooters activate the locking toggle switch 36 to release the blade within the foregrip. With a sharp flick of the wrist, or by pointing the foregrip downward, the blade 40 slides out of the body of the foregrip with the grip 30 acting as a blade handle. Activating the locking toggle switch 36 again locks the blade 40 with distal end 41 protruding in the deployed position. Shooters can then use the blade as needed.

Besides the uniqueness and functionality of the combined foregrip and knife, shooters can use this device in a one-handed operation without the need to release the grip on their battle rifle. Cited time and again, soldiers prefer AR-mounted accessories to be a one-handed operation wherever possible. The present invention knife satisfies that request.

The present invention provides more than one function by offering soldiers or shooters both a functioning foregrip and a field knife, which as every soldier knows there is always a need for edged-tools when in the field. Having a readily available blade makes their job much easier, thus providing multi-functional devices to aid soldiers and other shooters as well.

The VFG-2 (vertical foregrip with an integral razor or box-cutter blade) is similar in design to the VFG-1 wherein the foregrip top 31 attaches via the mounting device 25 to the Picatinny mounting rail 21. This version of the invention foregrip has an internal box-cutter type configuration 50 whereby industrial razor blades (dry-wall razors) can be installed in the foregrip for use when an edged-tool is required. This alternative design recognizes that in many jurisdictions within the United States "gravity" knives are considered illegal. And many other jurisdictions limit the acquisition and use of switchblades and "gravity" type knives to active-duty military and police. This omits usage by a large section of the civilian population of the VFG-1 knife. To meet the needs of civilian users and to provide soldiers/police officers with alternatives to the VFG-1 knife configuration, applicant provides a box-cutter design.

In place of the locking toggle switch found on the VFG-1 knife, the box-cutter configuration uses a spring-loaded sliding/locking mechanism 51 to deploy a standard sized industrial razor blade 50. The foregrip 30 can be disassembled and the position of the razor blade reversed to make use of the other half of the blade length. When both ends of the blade are completely dulled by excessive use, the end-user can easily replace the old blade with a fresh one.

Again, activation and usage are a one-handed operation thus making the box-cutter configuration as simple to use as the VFG-1 knife. And, too, replacement razor blades are easily acquired in large quantities at minimal expense.

In use, end-users simply press down on the spring-loaded slide lock 51 and push the button forward out the grip top 31 to deploy the razor blade. To retract, end-users again press down on the spring-loaded slide lock 51 and pull back on the button to withdraw the razor blade 50. The end-user again is provided a multi-functional tool that is both a foregrip and box-cutter contained within the same unit, the foregrip providing a handle. This provides soldiers and others a useful edged-tool when deployed on field maneuvers and satisfies the need for one-handed operations. And, too, this makes the integral edged-tool available to those who otherwise would not be permitted to acquire the "gravity knife" configuration as described previously with the VFG-1 knife.

The VFG-3 (integral multi-tool configuration) is similar in design to the VFG-1 and VFG-2 wherein the body of the foregrip 30 attaches via a mounting device 25 to the Picatinny mounting rail 21. A multi-functional foregrip 30 that incorporates a unique multi-tool device 60 is provided. Contained within the interior 34 of the foregrip is the multi-tool device that is comprised of a "frame" or backbone 61 to which the various tools are attached.

The frame 61 attaches to the Picatinny mounting device 25 via a threaded knob 27 that is inserted into the mounting device 25 and screwed into place. When needed, the foregrip 30 is removed as previously described, and the multi-tool 60 is unscrewed from the Picatinny mounting device 25. Each of the tools mounted to the frame 61 are folded away from the frame on their individual hinge points for use. The various tools range from commonly needed tools such as flat-tipped or Phillips-head screw drivers, small cutting blades, chisel points, or hex wrenches of various sizes. The types and mix of tools to be determined by the manufacturer, but the multi-tool device is intended to provide end-users with handily accessible tools without the need to carry a separate tool box. In use the multi-tool device is unscrewed from the Picatinny mounting device and the tools, which are folded along the body of the frame, are rotated outward for use, then folded again and re-inserted into the body of the foregrip. Other prior art vertical foregrips do not generally use multi-tool devices.

The VFG-4 (integral spare flashlight) is similar in design to the VFG-1, VFG-2 and VFG-3 configurations wherein the body of the foregrip 30 attaches via the mounting device 25 to the Picatinny mounting rail 21. While other manufacturers offer Picatinny rail-mounted flash or spotting lights, the present invention foregrip with integral flashlight 70 offers a handily accessible spare flashlight that does not require the end-user to remove components already mounted to their battle rifle. Often Picatinny rail-mounted flashlights have external touch-pads to activate the flashlight when the end-user needs to deploy the light source in, say, clearing a room or when confronting an potential assailant. In that regard, the rail-mounted flashlight is more of a permanent component and part of the overall battle rifle configuration.

However, when a handy flashlight 70 is required, rather than remove a component from the battle rifle, soldiers (and other users) can quickly detach the present invention foregrip 30 with its internal spare flashlight 70 for those times when a quickly accessible light source is needed. In use, the spare flashlight contained within the vertical foregrip is removed by twisting and unlocking the foregrip threads/lugs similar to the previous configurations. The flashlight 70 within the foregrip 30 is activated, depending on manufacturing techniques, by a push-button 71 on the bottom of the flashlight 70 protruding through the foregrip bottom 32 or by a side-mounted on/off switch 72 protruding through a foregrip side 33, again depending on manufacturing techniques. The integral spare flashlight provides an easily accessible light source that does not require the end-user to disassemble their rail-mounted flashlight thereby compromising the set-up of their battle rifle. The present invention VFG with spare flashlight provides a handy, readily available light source that is always available when needed.

The VFG-5 (sliding/rotating mounting trunnion) provides a trunnion 80 comprised of a quarter-round mounting device that attaches to a rail 21 in the Picatinny rail system 20 in either the six o'clock and nine o'clock positions (for right-handed shooters) or the six o'clock and three o'clock positions (for left-handed shooters). The trunnion 80 is manufactured in a manner that permits the unit to be reverse-mounted for either left or right-handed shooters, but is essentially just one component. The vertical foregrip top 31 attaches to the trunnion 80 in the same manner that other components are mounted to the Picatinny rail system, only the trunnion 80 is curved to permit movement by the vertical foregrip 30.

With the two components mounted together, i.e., trunnion 80 and rail 21, the vertical foregrip 30 would start in the normal six o'clock position. A release button 81 near the top 31 of the vertical foregrip releases the frictional grip on the trunnion 80 so the VFG 30 can be rotated upwards to the nine o'clock position. When the button 81 is released, the VFG 30 engages a notch in the trunnion to retain the VFG in the, now, horizontal position. When ready, end-users simply press the VFG release button 81 and return the foregrip to the six o'clock position. When the trunnion is mounted in reverse, the action of a left-handed shooter would be the same as for right-handed shooters, only the positions are six o'clock for the vertical deployment and three o'clock for the horizontal position. In use, grip positions can be changed from vertical to horizontal by depressing the release button built into the VFG and rotating the grip to either the nine o'clock or three o'clock positions, depending whether shooters are right or left-handed.

Typical prior art vertical foregrips are just that, mounted in the vertical position. However, some modern tactical and firearms training courses advocate the "hand over fore-grip" method of gripping the fore-end of the AR battle rifle to "drive" the weapon either left or right when the weapon is used in tactical situations. The ability to control how far the weapon swings when "driving the weapon" left or right means that shooters have more control over the weapon and can align on target faster without swinging too far in a given direction when moving from one position to another. The present invention VFG with trunnion mount 80 allows shooters to re-position their attached vertical foregrips 30 to virtually achieve the "hand over fore-end" type grip without having to release their hold on the rifle, while also being able to control the movement of the weapon just as securely and positively as if they were using the hand-over-fore-end grip method. Additionally, with the VFG able to move into either the nine o'clock or three o'clock positions, for shooters who are engaged in urban defense or house-clearing situations the vertical foregrip can be moved to the horizontal position and the end of the foregrip can be placed against a door frame thereby giving shooters a more stable platform from which to provide covering fire or engage an assailant. Being in the horizontal position and wedged against a door frame acts as a brace to stabilize the weapon to help achieve a more accurate sight-picture.

In summary, the present invention VFG configurations present shooters with options and tools not previously available in the firearms industry. This versatility helps end-users (whether soldiers, police officers, or civilians) to select the multi-functional tool that best suits their mission, surroundings, or personal needs.

It is understood that the above-described embodiment is merely illustrative of the application. Other embodiments may be readily devised by those skilled in the art, which will embody the principles of the invention and fall within the spirit and scope thereof.

What is claimed is:

1. A foregrip for a firearm, comprising:
   a mounting device configured to attach to a mounting rail of a firearm;
   a grip body with a top portion configured to be repeatably attached and detached to the mounting device by rotational action about a longitudinal axis of the grip body; and
   a lateral side portion configured to be gripped by the hand of a person using a firearm;
   a cavity disposed within the grip body; and
   a blade disposed at least partially within the cavity, wherein the blade is movable between a retracted position and a deployed position relative to the grip body.

* * * * *